(12) United States Patent
Jedrzejewski

(10) Patent No.: US 9,602,631 B2
(45) Date of Patent: Mar. 21, 2017

(54) SYSTEM FOR SYNCHRONIZING WEB BROWSERS

(71) Applicant: Tisoft Wojciech Jedrzejewski, Inowrocł aw (PL)

(72) Inventor: Wojciech Jedrzejewski, Inowrocł aw (PL)

(73) Assignee: Tisoft Wojciech Jedrzejewski, Inowroclaw (PL)

( * ) Notice: Subject to any disclaimer, the term of this patent is extended or adjusted under 35 U.S.C. 154(b) by 197 days.

(21) Appl. No.: 14/528,581

(22) Filed: Oct. 30, 2014

(65) Prior Publication Data

US 2016/0112541 A1  Apr. 21, 2016

(30) Foreign Application Priority Data

Oct. 20, 2014 (EP) .................................. 14460070

(51) Int. Cl.
| | | |
|---|---|---|
| G06F 3/00 | (2006.01) | |
| H04L 29/06 | (2006.01) | |
| H04L 29/08 | (2006.01) | |
| G06F 9/54 | (2006.01) | |
| G06F 17/30 | (2006.01) | |

(52) U.S. Cl.
CPC .............. *H04L 67/42* (2013.01); *G06F 9/542* (2013.01); *G06F 17/30899* (2013.01); *H04L 67/10* (2013.01); *G06F 2209/544* (2013.01)

(58) Field of Classification Search
CPC ........................... H04L 67/42; G06F 2209/544

USPC .......................................................... 715/733
See application file for complete search history.

(56) References Cited

U.S. PATENT DOCUMENTS

| | | | | |
|---|---|---|---|---|
| 2002/0002614 | A1* | 1/2002 | Murphy .................. | G06F 9/465 709/226 |
| 2003/0063119 | A1* | 4/2003 | Bloomfield ........... | G06F 9/4445 715/738 |
| 2004/0019465 | A1* | 1/2004 | Kerr ....................... | G06F 9/542 702/189 |
| 2006/0069702 | A1* | 3/2006 | Moeller .................. | G06F 9/542 |
| 2008/0250073 | A1* | 10/2008 | Nori .................. | G06F 17/30368 |
| 2009/0248802 | A1* | 10/2009 | Mahajan ............... | G06F 9/4445 709/204 |
| 2012/0317170 | A1* | 12/2012 | Burkhardt ............... | H04L 67/12 709/203 |
| 2014/0244715 | A1* | 8/2014 | Hodges ................... | H04L 67/42 709/203 |

* cited by examiner

*Primary Examiner* — William Titcomb
(74) *Attorney, Agent, or Firm* — Katten Muchin Rosenman LLP

(57) ABSTRACT

System for synchronizing web browsers in the client/server circuit, in which the first application on one computer is connected through a communication link with a type of web browser application on the other computer, distinguished by that it contains web server (2), control panel-controlling interface (8), data base SQL (3), consisted of synchronization table (4) and a data table (5) on the first computer, and the web server (2) has also synchronizing circuit (6) as well as the panel of the system management (7), controlling at least two terminal devices, which are remote client computers (9), (10) and (11), equipped with web browser with synchronization module.

2 Claims, 7 Drawing Sheets

SYSTEM FOR SYNCHRONIZING WEB BROWSERS

The subject matter of the invention is a system for synchronizing web browsers, installed on the different computers having access to a common web server in order to display the same webpage and change the displayed web address through an event occurring in the client/server system on any of linked web browsers, facilitating users navigation in web services.

The invention relates to electronic communication i.e. synchronous data and images transfer as well as sound recording.

BACKGROUND OF THE INVENTION

The patent description PL 180570 discloses the method, the device and the computer program product for communication in a client/server circuit having a client application disposed in the first computer. The client application communicates with a server application disposed in the other computer remote from the first one. The client application as well as server application use independent client/server communication protocol for communication between the client and the server and at least one communication segment between client application disposed in the first computer and the server application disposed in the second computer. The communication segment is implemented through an external communication link. The method, the device as well as the software system take over the transmission within the independent client/server protocol, coming from a remote client before the transmission through the external communication link and process the transmissions coming from the client into the second independent client/server communication protocol. The processed transmission is being sent through the external communication link and received after sending through the external communication link. Transmission received by the external communication link is processed from special client/server communication protocol into independent client/server communication protocol. Transmission coming from a remote client is being provided to the sever within the independent client/server communication protocol. Diversity, intermediate access store as well as protocol reduction techniques improve transmission parameters through the external communication link.

The systems for synchronizing of web browser settings between devices, on which the program has been installed are also known. Synchronization refers to settings, bookmarks, cards, history and other elements and consists in sending selected elements to the server by all devices connected to the program account and synchronization on other devices merges only those, that have not sooner been present on the said device.

SUMMARY OF THE INVENTION

The essence of the solution according to the invention is a system allowing to display the same webpage on every browser coupled with a system as well as to change the displayed web address through an event occurring on any of coupled browsers. The solution according to the invention allows to transfer information about the events occurring on any of terminal devices to the web server and from the server to every terminal device.

The system according to the invention consists of the web server and at least two terminal devices, that display contents transferred in http protocol, connected to the network.

The system according to the invention is shown on FIG. 1, where component 1 is a computer containing web server 2 visible in the Internet and an intranet and control panel 8. Component 3 is a SQL database, which includes synchronizing circuit 4, that stores synchronization counter, synchronization session identifier and address of the current HTML document as well as data tables 5.

Web server is equipped with synchronizing software 6, which allows the terminal devices 9, 10, 11 to communicate with synchronization table 6, including downloading the address of current html document, checking synchronization counter, saving changes in synchronization counter as well as saving the address of current HTML document after address change.

The start-up document 8, which starts the synchronization session, is the component of web server 2. The start-up document is the HTML document containing synchronizing component which is started by the browser on the terminal device and a control panel of circuit 7.

The circuit consists of terminal devices 9, 10, 11 or any number of terminal devices having web browser. The task of the terminal device having web browser is to download start-up document, run synchronization component and display consecutive current documents, and after the address change by the user export to the server the new address of current web page and increase the synchronization counter on the server 2. Terminal devices communicate with the web server using http protocol, checking periodically the need for certain actions such as displaying new contents. Each terminal device—clients, monitor the web server with a frequency of 1-5 seconds, verifying the need to perform the actions—commands. In this way operation of several devices is synchronized in bidirectional manner. The frequency of verification depends on synchronization mechanism and line capacity. Devices such as television set, mobile phone, smartphone, personal computer or other devices having ability to display contents transmitted in http protocol e.g.: refrigerator with monitor and browser connected to the network may be the terminal devices, which are terminal elements of the system equipped with the web browser. Moreover all types devices for data displaying e.g. large-scale LED video screens, electronic information boards as well as devices collecting data to create analysis of various types may be the terminal devices.

The system according to the invention enables concurrent operation and display of the same content—reproducing of sounds, images, texts etc. on all devices included in the system. The system allows users to interact and to transfer the events, causing change in displayed information by any user. The event occurring on any device is transferred to the web server and this automatically causes change in displayed content on each of the connected devices.

Industrial application of the invention consists in transferring any audiovisual content available on the web server to the system users. Users, while working, are able to change content displayed on their devices, causing identical change on other devices.

Easy control of the events taking place e.g. during temperature change for a large number of sensors is the advantage of the system for distributed system users. Standard devices equipped with http browser e.g. smartphone are sufficient to change the displayed information e.g. on large-scale LED video screens—this is the advantage for users of the devices displaying information remotely. An additional advantage for the users of presentation and videoconferences is easy handling of all kinds of demonstration without need to use large screens. Presentations may be displayed on conferees' individual laptop computers anywhere and scattered.

The advantage for a help desk user is a significant simplification of navigation on the web sites, based on the operator support, while the advantage for telemarketers is the possibility to offer goods to customers by means of double basket with navigation controlled and synchronized in bidirectional manner. An additional advantages for managers are as follow: possibility to monitor at the same time work of several telemarketers, to create users' profiles as well as various sale analysis.

The advantage for the measurement and control systems is possibility of permanent monitoring of system efficiency and availability of the terminal devices to receive the commands.

The solution according to the invention simplifies and solves the problem of navigation on complicated and complex websites. The invention is applicable in both bank and producer's support systems, in call centers systems or in offering goods on internet with participation of a telemarketer.

Another application of the solution is the synchronization of input-output devices e.g. remote measurement and stabilization of the temperature or remote control of the terminal devices allowing permanent readiness monitoring of the terminal devices for command receiving.

BRIEF DESCRIPTION OF THE DRAWINGS

The subject of the invention is shown in two embodiments on the drawings where.

While

Figure 6:
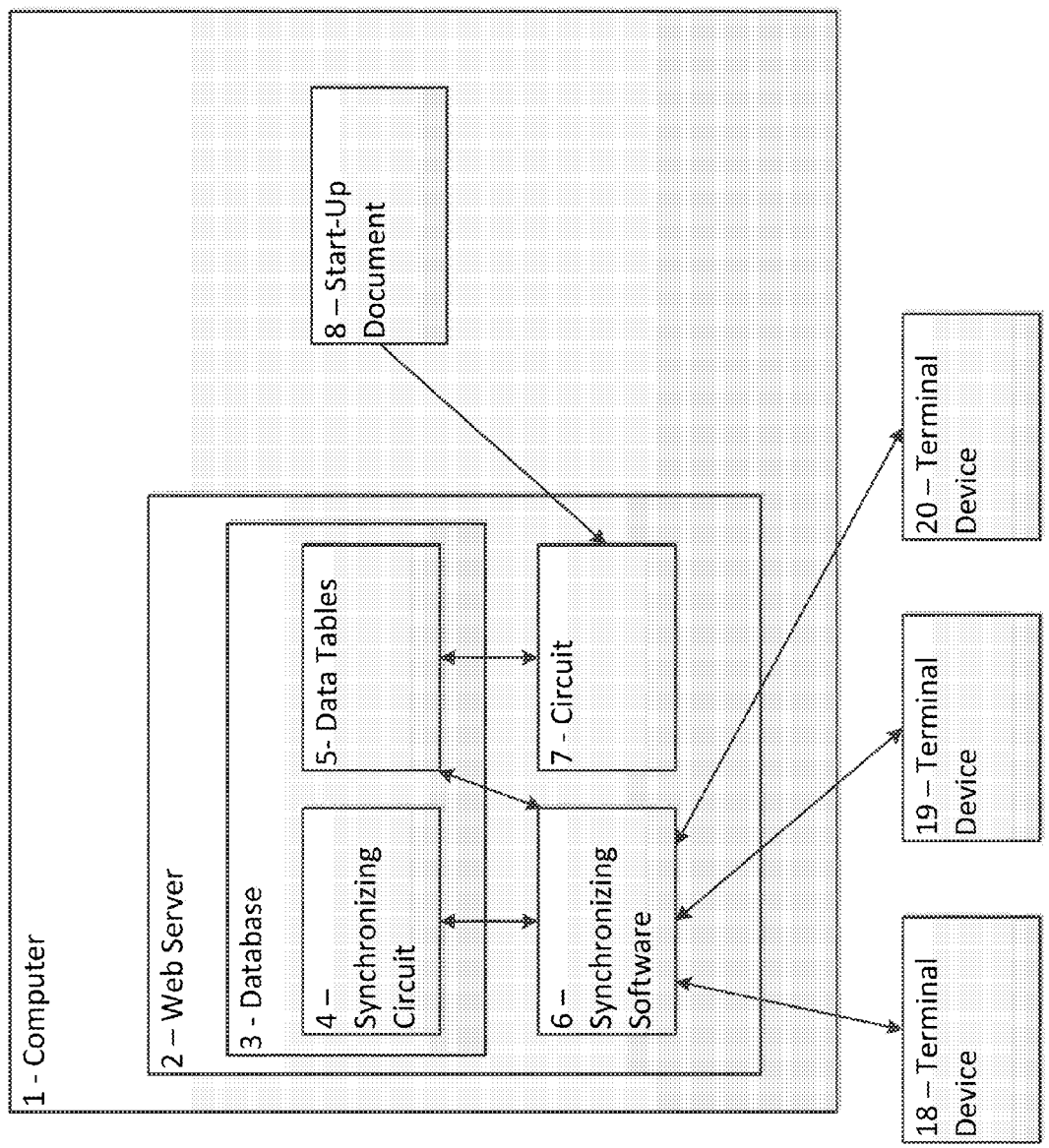
Figure 7:
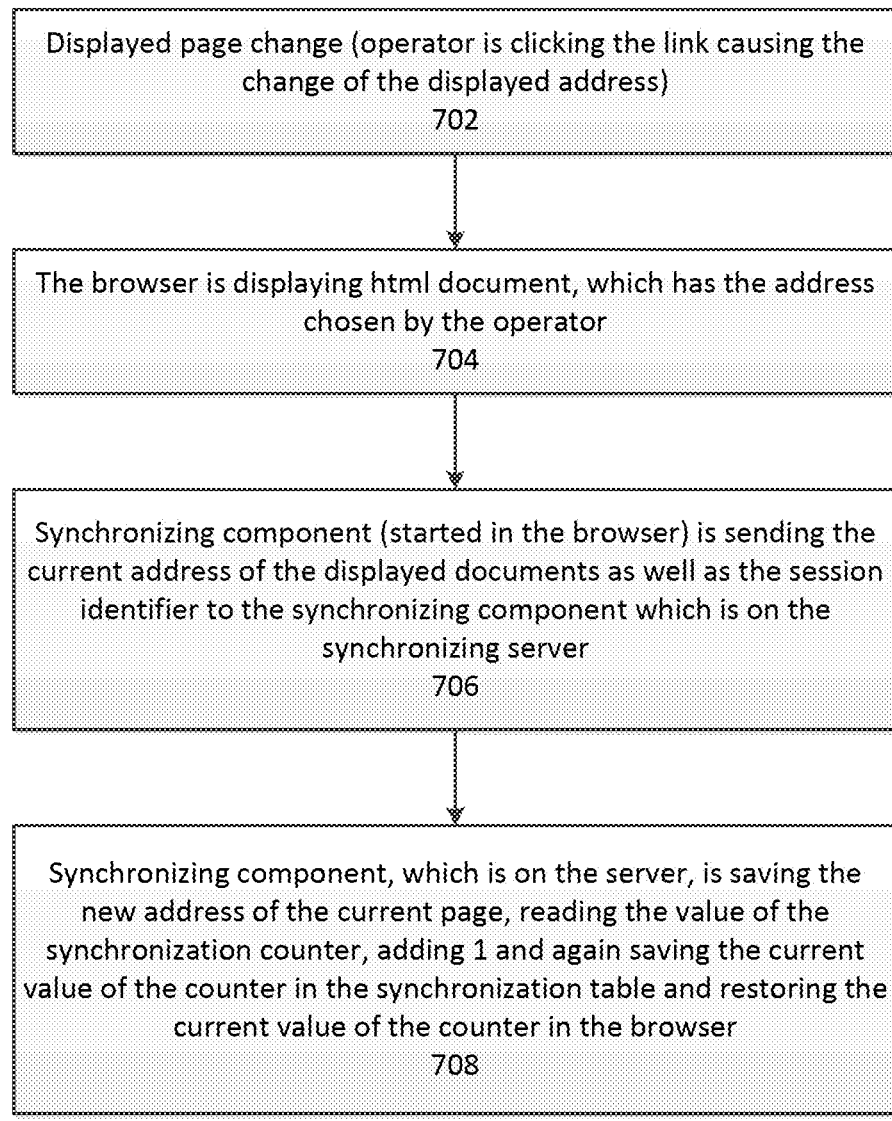

The subject of the invention is also illustrated in FIG. 6, FIG. 7, which present respectively the system according to the invention ensuring server-client synchronization and the diagram illustrating the system behavior after the event consisting in the change of the displayed webpage. It is illustrated in FIG. 6.

DETAILED DESCRIPTION OF THE INVENTION

Example 1

Figure 1:
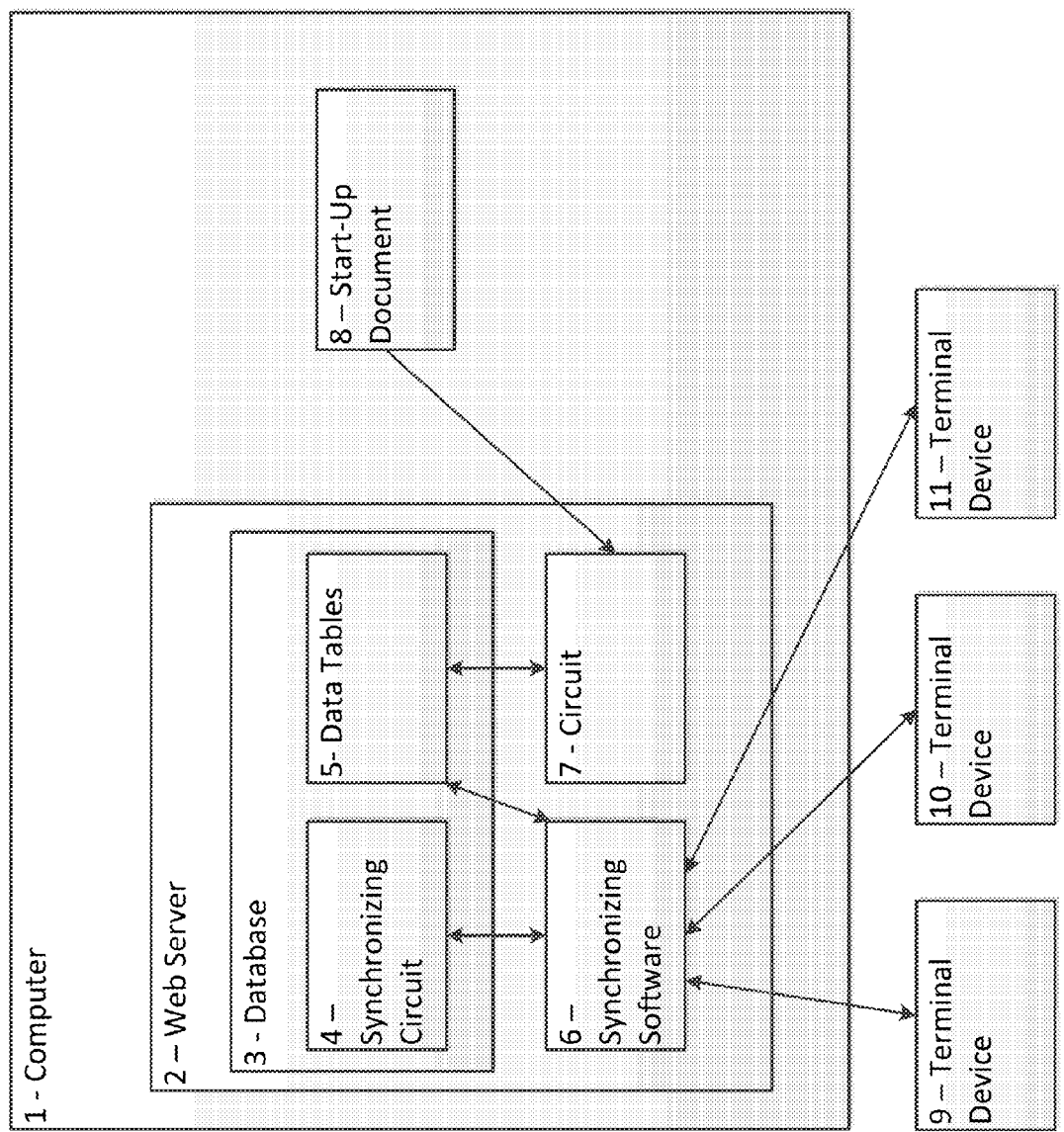
FIG. 1 & FIG. 2 are block schematic diagrams of browser/server circuit in the server-client system for synchronization.
Figure 2:
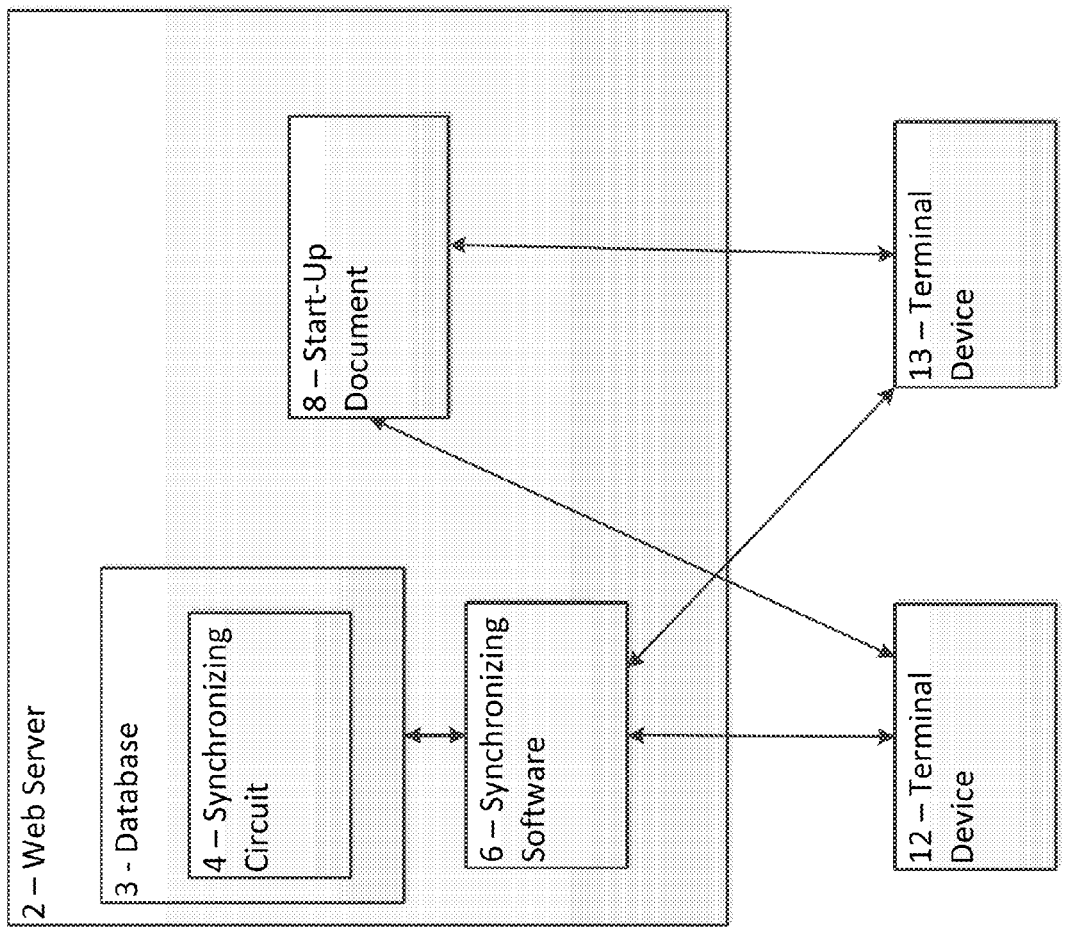

The system shown in FIG. 2 consists of:
2. Web server
3. Data base
4. Synchronization table (retains the synchronization counter, the session synchronization identifier and the address of the current html document)
6. Synchronizing software enables communication of the terminal device with the synchronization table (verification of the synchronization counter, downloading the address of the current html document, saving the changes in the synchronization counter, saving the address of the current html document after the event of the address change)
8. Start-up document—starting the synchronization session (html document containing synchronizing component started by the browser on the terminal device)
12. Terminal device with the web browser—downloading the start-up document, starting the synchronization component, displaying consecutive current documents; after the event of the address change by the user—sending new address of the current page to the server, enlargement of the synchronization counter of the value 1
13. Terminal device with the web browser—downloading the start-up document, starting the synchronization component, displaying consecutive current documents; after the event of the address change by the user—sending new address of the current page to the server, enlargement of the synchronization counter of the value 1.

In FIG. 2 there is the web server 2, installed on a computer and visible on the Internet or an intranet network, data base SQL 3, installed on the web server, which contains system for synchronization and registration of events as well as software 4. The system performs synchronization of a HTML document which is installed on the server and contains synchronizing component run by the browser on the terminal device. The system also consists of terminal devices 12, 13 which are two computers. During the session start-up the browser opens the said webpage 8 after clicking the link received in the email or entering the address by the user.

Figure 3:
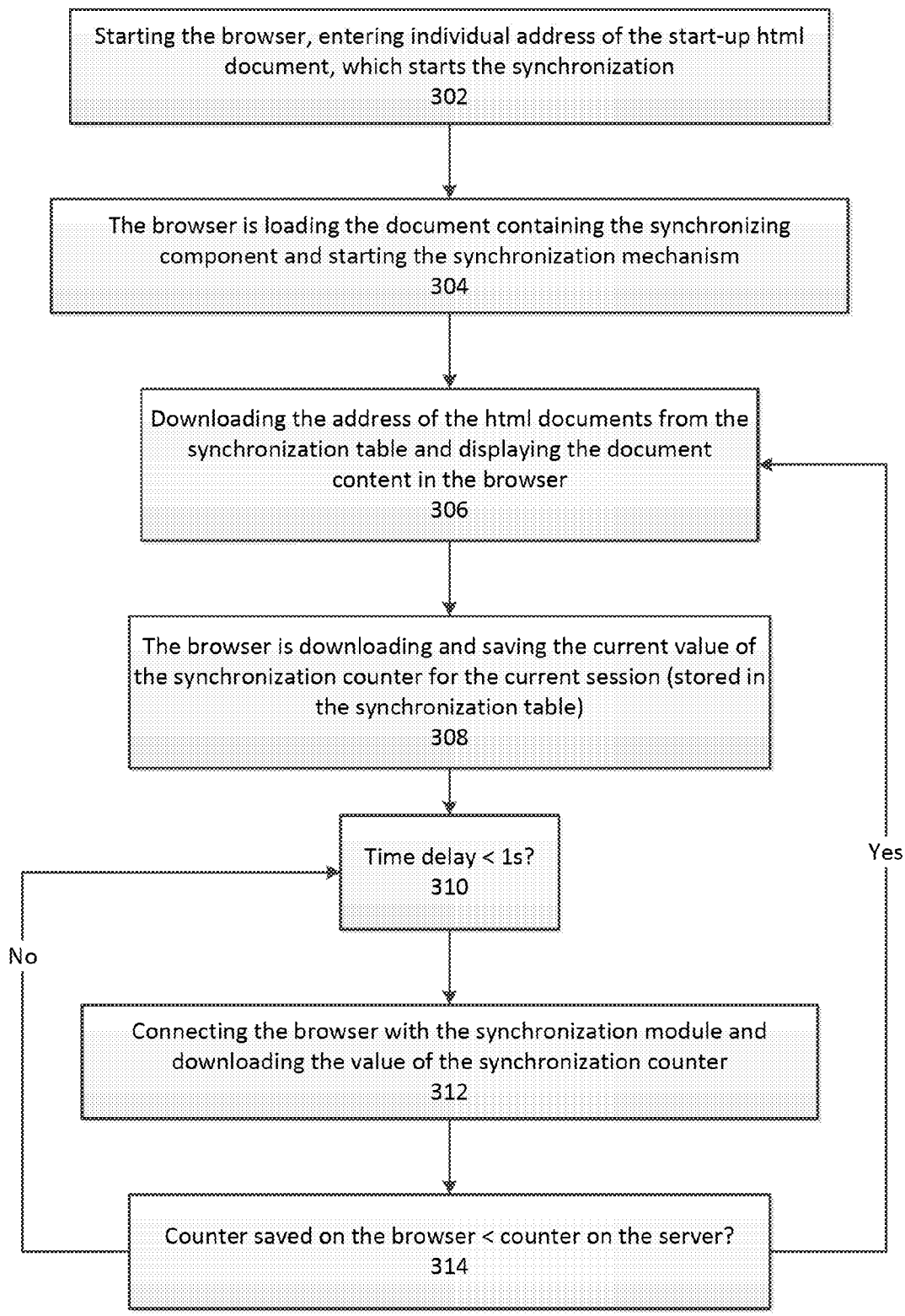
FIG. 3 is a flow chart of server-client synchronization in the system synchronization state.

The start-up webpage is a unique link which is common for the browser of the operator as well as for the client browser. Start-up webpage is equipped with synchronizing unit started in the browsers of the terminal devices. The unit captures the events that take place in the browsers and connects the web server 2 by means of self-timer (e.g. ASP.NET or AJAX object timer). Synchronizing software 6 as well as data base 3 are installed on the web server. Data base contains synchronization table 4, which is polled with specific frequency, e.g. every one second. There are columns in the table with ID for the startup webpage (there may be many concurrent sessions), synchronization counter as well as address, which should direct the browser. The table contains as many records as there are active ones at the moment of start-up sessions. FIG. 3 illustrates the diagram of the system operation. The following takes place: 302. launching of the browsers on the terminal devices 304. fetching and loading the start-up document and launching of the synchronization component in the client browser 306. connection with synchronization software on the web server, downloading the current document from the synchronization table and displaying the content of the document in the browser. 308. downloading the current value of the synchronization counter and storing the value of the synchronization counter in the object that stores the variables of the client session. 310. one second delay (idle time) 312. browser reconnection with the synchronizing software on the web server and downloading the synchronization counter 314. verification if the counter saved in the browser is smaller than the counter of the server; if not, one second delay (idle time) occurs; if yes, connection with synchronization software on the web server occurs as well as downloading the address of current document from the synchronization table and displaying the content of the document in the browser. After the event, displayed webpage changes on any of synchronized browsers.

Example 2

Figure 4:
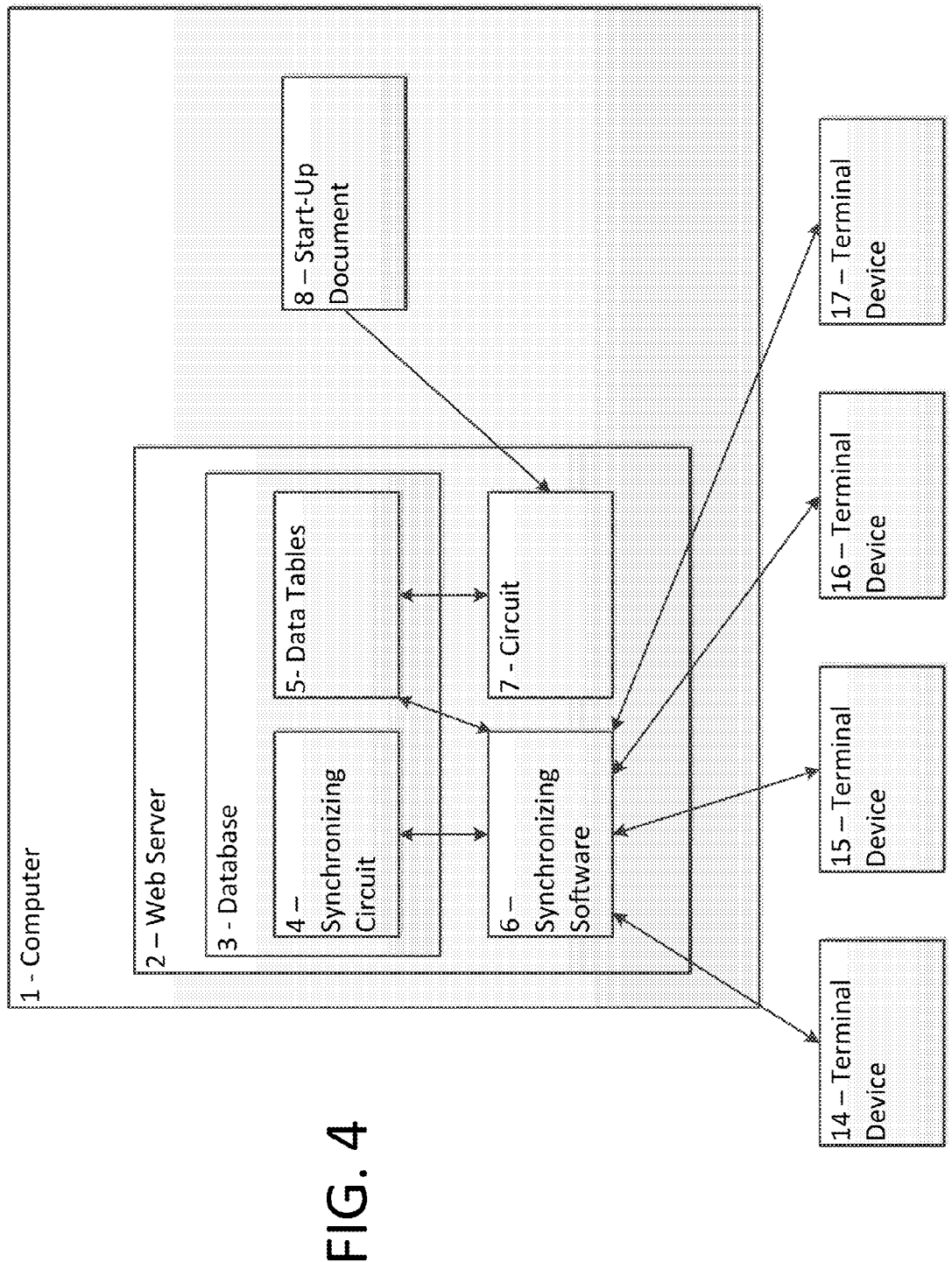
FIG. 4 is a block schematic diagram of browser/server circuit in the server/client system in the synchronization state of the displaying devices.

FIG. 4 illustrates the system according to the invention which provides server-client synchronization for the devices. The system consists of the web server 2 installed on the computer 1 and is visible in the Internet and an intranet network, data base SQL 3, installed on the web server, which contains the system for synchronization and registration of the even as well as software 4. The system performs synchronization of the HTML document 6 which is installed on the serve and contains synchronizing component run by the browser on the terminal device. The system also consists of the terminal devices 14, 15, 16, 17 which are any computers controlling the transfer of information to the devices, forwarding it to the wider client. There are:

14 terminal device; program updating information in local data base with synchronization module (e.g. electronic timetable)
15 terminal device; program updating information in local data base with synchronization module (e.g. interactive information board)
16 terminal device; program displaying information with synchronization module (e.g. large-scale led video screen)
17 terminal device; program updating information in local data base with synchronization module (e.g. online newspaper)

Figure 5:
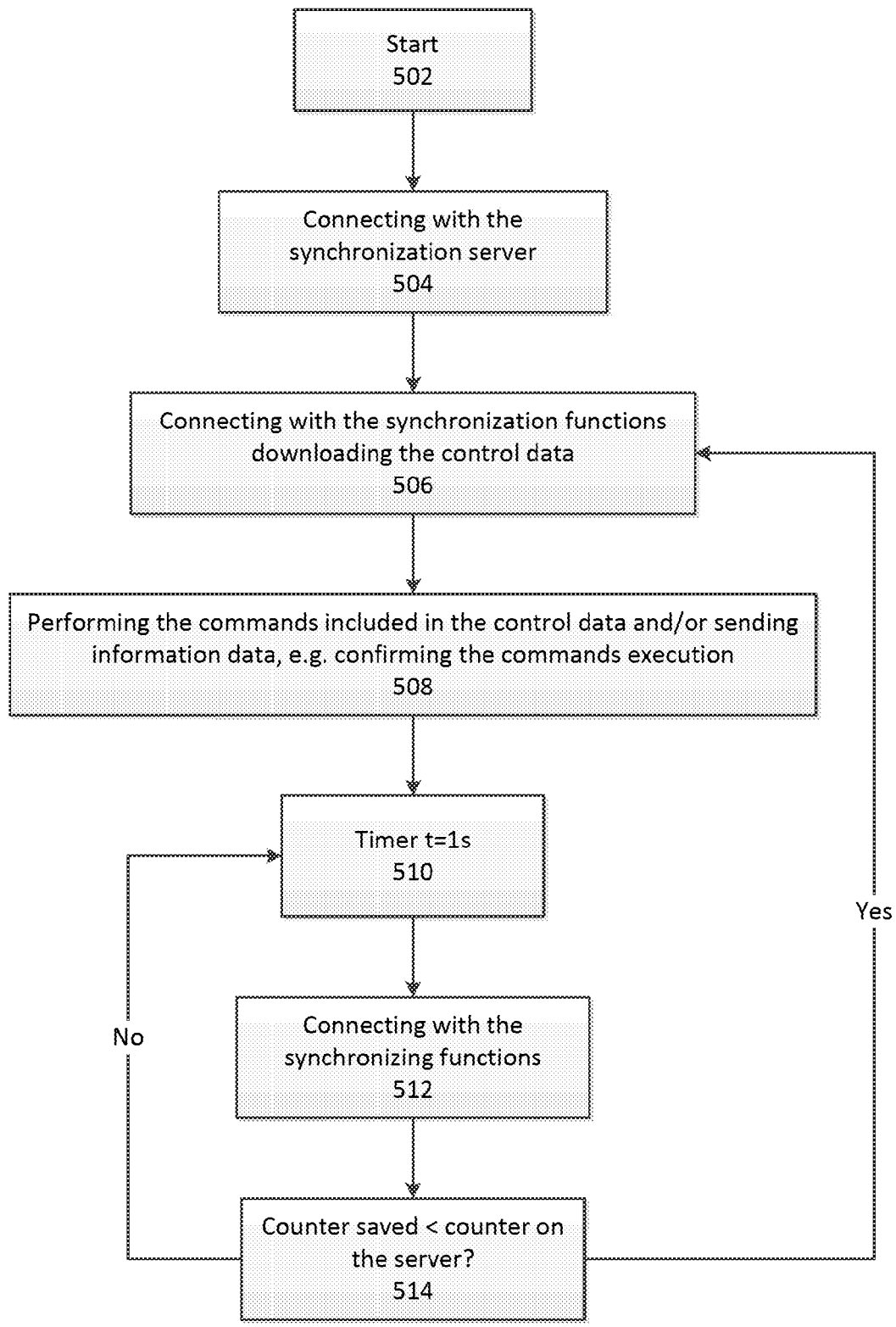
FIG. 5 is a flow chart of client-server synchronization in synchronization state of the displaying devices, e.g. electronic timetable, information board, large-scale LED video screen, online newspaper.

FIG. 5 illustrates the diagram of operation of the system server-client for the displaying devices.

Example 3

FIG. 6 illustrates the system according to the invention which provides server-client synchronization. The system consists of the web server 2 installed on the computer 1 and is visible in the Internet and an intranet network, data base SQL 3, installed on the web server, which contains system for synchronization and registration of the events as well as software 4. The system is performing the synchronization of the HTML document, installed on the server. The HTML document contains synchronizing component started by the browser on the terminal device. The system also consists of the terminal devices 18, 19, 20 which are any computers having web browser with synchronization module and input/output module.

FIG. 7 illustrates how the system operates after the event, which is change of the displayed page.

When the operator clicks the link causing the change of the displayed address by the synchronizing unit at 702, the following operations are performed: the desired address is displayed in the browser causing an event 704, synchronization component run in the browser causing the event connects with the synchronizing component on the synchronization server, then parameters of the session identifier and the new address of the web page chosen by the user 706 are forwarded, synchronizing component located on the server records the new address of current page, reading from the synchronization table the values of the synchronization counter, adding 1 and again recording in the synchronization table the current value of the counter as well as giving back of the counter current value to the browser 708.

Operations on the servers are as follows: blocking the synchronization table, downloading the value of the current synchronization counter, adding to the counter value 1, recording in the synchronization table of the address chosen currently by the user, recording the enlarged counter in the synchronization table and unblocking the table, optional recording of the event to the table of registered events, giving back of the current value of the counter to the browser, recording of the counter value in the variables of the session, synchronizing reading by the Timer after the event occurred. The reading takes place on all browsers synchronized by the start-up web page with synchronization frequency in the range of 1-5 seconds. Connecting the function on the server and transmission of the start-up web page ID parameters, synchronization counter. The function operation on the server is as follows: downloading the value of the current synchronization counter, comparing the current counter value with received one from the browser. If the value of the current counter is greater than the value of the counter received, transferring the address of the read page found in the synchronization record field as well as the current counter value to the browser take place, otherwise transferring the value [False] takes place. After receiving the reply from the function: if the reply has a value [False], no action occurs, otherwise recording the received counter value to the variables of the session and displaying the page of the received address take place. In the course of session shut-up synchronizing record is being erased.

Example 4

Example 4 illustrates the solution according to the invention involving the application of the system for the sale of goods, which is described in details in the example involving sale of goods with the participation of a telemarketer. Control unit captures parameters with unique session ID from URL 1. Telemarketer is contacting the customer and transferring the startup address with session ID.
2. In the course of the talk, customer is starting the web browser on his computer writing the address indicated by the telemarketer down.
3. The customer web browser is connecting with the browser of the telemarketer and then telemarketer is taking over the control of the customer web browser.
4. In the course of the talk with the customer telemarketer, together with the customer is navigating the online shop presenting goods on the client computer and putting them into the client basket.
5. At the same time the customer is able to view products on very accurate pictures as well as to zoom in and to enlarge the details.
6. Customer is receiving an e-mail and after clicking on the link or giving the password of his account finalizes the transaction (telemarketer can not complete the transaction)
7. Customer is receiving an e-mail confirming the purchase.
8. In the course of session termination the record in the synchronization table is being erased.

The embodiments of the invention have been illustrated and described, but it is possible that many modifications and applications may be further presented in the art. It is understood that the attached claims will include all such modifications and changes if they result from the essence of the invention.

What is claimed is:
1. A system for synchronizing web browsers, the system comprising:
   a web server comprising:
      a web browser for displaying web pages;
      a control panel with a control interface;

a synchronization database having a synchronization table stored thereon for storing a synchronization value and a session identifier; and a synchronization circuit for updating the synchronization table; and a plurality of terminal devices, each terminal device being connected to the web server, and each terminal device comprising;

a web browser for displaying web pages;

wherein the web browser include a synchronization module for storing the session identifier acquired from the synchronization circuit and for interfacing with the synchronization circuit;

wherein, if a user of a first terminal device changes a web page displayed in the web browser of the first terminal device from a first web page to a second web page, the synchronization module of the first terminal sends the address of the second web page to the synchronization circuit, and the synchronization circuit stores the address of the second web page as the session identifier and increments the stored synchronization value by a predetermined value.

2. The system according to claim 1, wherein the synchronization module of each web browser periodically queries the synchronization database and compares a stored synchronization value with the synchronization value stored in the database, and, if the stored synchronization value and the synchronization value stored in the synchronization database do not match, the synchronization module:

stores the value stored in the synchronization database as the stored synchronization value, retrieves the session identifier from the synchronization database, and causes the web browser to display a web page specified by the session identifier.

* * * * *